Jan. 4, 1927.
A. CASEY
1,613,083
CREAM SEPARATOR
Filed Feb. 16, 1926
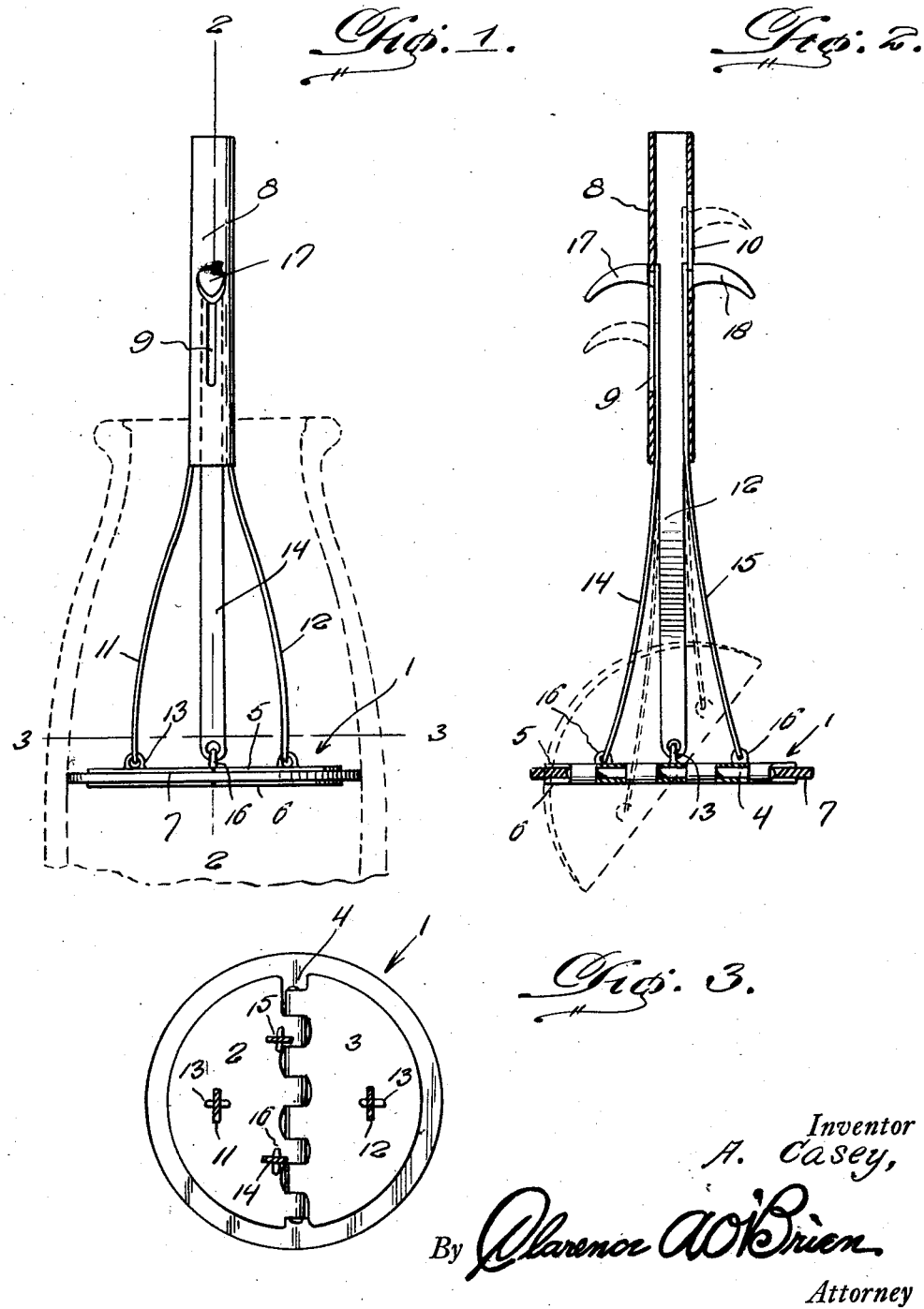
Inventor
A. Casey,
By Clarence A. O'Brien,
Attorney Patented Jan. 4, 1927.

1,613,083

UNITED STATES PATENT OFFICE.

ARTHUR CASEY, OF CUSICK, WASHINGTON.

CREAM SEPARATOR.

Application filed February 16, 1926. Serial No. 88,609.

The present invention relates to improvements in cream separators and has for its principal object to provide an implement which may be readily and easily inserted in a bottle of milk, the same including a separator member which when actuated so as to be disposed in a substantially horizontal position at a point directly below the cream line, will enable the cream to be separated from the milk.

A further object is to provide a cream separator of the above mentioned character which will at all times be positive and efficient in carrying out the purposes for which it is designed, the same being further simple in construction, inexpensive, strong, and durable, and further well adapted to the purpose for which it is designed.

Other objects and advantages of the invention will become apparent during the course of the following description taken in connection with the accompanying drawing.

In the accompanying drawing forming a part of this application and in which like numerals designate like parts throughout the several views:

Figure 1 is a side elevation of the cream separator embodying my invention, showing the same in an operative position within a milk bottle.

Figure 2 is a vertical sectional view taken approximately on line 2—2 of Figure 1, and Figure 3 is a transverse section taken on line 3—3 of Figure 1.

In the drawing wherein for the purpose of illustration is shown the preferred embodiment of my invention, the numeral 1 designates generally the separator member, the latter including the complementary half sections 2 and 3 respectively. These sections are hingedly secured together at their adjacent edges as indicated at 4.

Each of the half sections comprises the upper and lower spaced plates 5 and 6 between which is clamped or otherwise secured the rubber disc 7. The disc 7 is of a greater diameter than the diameter of the hingedly connected sections 2 and 3 so that the marginal portion of the rubber disc will be permitted to engage the inner surface of a milk bottle when the device is inserted in a bottle, without any danger of the separator member breaking the bottle. Furthermore, the rubber disc will provide a seal so as to prevent any possibility of the milk in the bottle being poured out with the cream when the latter is being separated from the milk.

Forming a part of the present device is the tubular handle 8, the same being provided at diametrically opposite points with the longitudinally extending slots, 9 and 10, respectively. As is clearly shown in Figure 2 of the drawing, the slot 10 is arranged at a point above the slot 9 and the purpose of this particular construction will hereinafter be more fully described.

A pair of flat spring arms 11 and 12 respectively are pivotally connected at their lower ends to the intermediate portions of the top plates 5 of the half sections 2 and 3 respectively through the medium of suitable eye members 13, in the manner as clearly illustrated in Figures 1 and 3. The flat spring arms 11 and 12 gradually converge toward their upper ends and are secured to the lower end of the tubular handle 8 in any suitable manner at diametrically opposite points. These spring arms 11 and 12 normally tend to maintain the hingedly connected half sections 2 and 3 of the separator member 1 in a collapsed or folded position.

An additional pair of flat spring arms 14 and 15 respectively of a greater length than the aforementioned pair of arms are pivotally connected at their lower ends to the top plate 5 of the section 2 through the medium of the eyes 16 which are arranged on the top plate of the section 2 at a point adjacent the hinge 4 in the manner as clearly shown in Figure 3. The last mentioned pair of spring arms 14 and 15 also converge gradually toward their upper ends, and the upper ends of these arms extend upwardly into the tubular handle 8. Suitable finger grips such as are shown at 17 and 18 have their shank portions secured to the upper ends of the arms 14 and 15 respectively, and these finger grips extend outwardly through the slots 9 and 10 respectively in the manner as clearly shown in Figure 2.

The operation of my improved cream separator may be briefly stated as follows: By pushing downwardly on the finger grip 17, and simultaneously pulling upwardly on the finger grip 18, the separator member 1 will be tilted bodily and during such operation, the spring arms 11 and 12 will automatically move the half sections of the separator member inwardly toward each other so that the separator member will assume the position shown in the dotted lines in Figure 2. When in this position, the separator member may be easily inserted in a bottle of milk, and when said separator member is disposed at a point directly below the cream line, the finger grip 17 is pulled slightly upwardly and the finger grip 18 is pushed downwardly so as to move the half sections of the separator member into a horizontal position, and at the same time, said half sections will be forced outwardly and disposed in the same horizontal plane and thus assume the position shown in Figure 1 of the drawing. The marginal edge of the rubber disc 7 will then be in engagement with the inner surface of the bottle and thus provide a seal for preventing the milk below the cream line being poured out of the bottle during the removal of the cream from the bottle of milk. After all the cream has been removed, the separator may be readily and easily removed from the bottle by manipulating the finger grips 17 and 18 so as to cause the separator member 1 to assume the position shown in the dotted lines in Figure 2. The slots 9 and 10 will limit the sliding movement of the finger grips and the spring arms with which said spring grips are associated so as to insure the positive and efficient operation of the implement.

It will thus be seen from the foregoing description, that I have provided a very novel, yet simple device which may be easily operated for carrying out the purposes for which it is designed.

While I have shown the preferred embodiment of my invention it is to be understood that minor changes in the size, shape, and arrangement, of parts may be resorted to without departing from the spirit of the invention and the scope of the appended claims.

Having thus described the invention, what I claim as new and desire to secure by Letters Patent is:—

1. A cream separator of the class described comprising a separator member including a pair of complementary half sections hingedly secured together, a handle, a pair of spring members pivotally secured at their lower ends to the respective sections, the upper ends of said spring members gradually converging and being secured to the handle at diametrically opposite points, said spring members tending to maintain the sections in a collapsed position, means for bodily tilting the separator member to facilitate the insertion and removal of the separator member in a milk bottle, said means further forcing the complementary sections to an open horizontal position when actuated, said last mentioned means comprising a pair of spring arms pivotally connected at their lower ends to one of the sections at a point adjacent the hinged connection between the sections, the upper ends of the spring arms converging and being adapted for slidable movement within said handle, said handle having longitudinally extending slots formed therein at diametrically opposite points, and finger grips secured to the upper ends of the respective slidable arms and extending outwardly through the respective slots, said finger grip facilitating the actuation of the section of said separator member.

2. A cream separator of the class described comprising a separator member including a pair of complementary half sections, each of said half sections including upper and lower spaced plates, a rubber disc secured between the upper and lower spaced plates of said half sections, said disc being of a greater diameter than the diameter of the half sections, said half sections being hingedly secured together, a handle, a pair of spring members pivotally secured at their lower ends to the respective half sections, the upper ends of said spring members gradually converging and being secured to the handle at diametrically opposite points, said spring members pending to maintain the half sections in a collapsed position, means for bodily tilting the separator member to facilitate the insertion and removal of the separator member in a milk bottle, said means further forcing the complementary sections to an open horizontal position when actuated, said last mentioned means comprising a pair of spring arms pivotally connected at their lower ends to the top plate of one of the half sections at a point adjacent the hinged connection between the sections, the upper ends of the spring arms converging and being adapted for slidable movement within said handle, said handle having longitudinally extending slots formed therein at diametrically opposite points, and finger grips secured to the upper ends of the respective slidable arms and extending outwardly through the respective slots, said finger grips facilitating the tilting of the half sections of the separator as well as collapsing and extending the same outwardly in a horizontal position.

In testimony whereof I affix my signature.

ARTHUR CASEY.